(12) United States Patent
Udy

(10) Patent No.: US 6,962,137 B2
(45) Date of Patent: Nov. 8, 2005

(54) TWO-CYCLE ROTARY ENGINES

(76) Inventor: Joseph Dale Udy, 4466 S. Helena Way, Apt. 362, Aurora, CO (US) 80015-4415

( * ) Notice: Subject to any disclaimer, the term of this patent is extended or adjusted under 35 U.S.C. 154(b) by 39 days.

(21) Appl. No.: 10/890,311

(22) Filed: Jul. 13, 2004

(65) Prior Publication Data

US 2004/0255899 A1 Dec. 23, 2004

Related U.S. Application Data

(63) Continuation-in-part of application No. 10/357,547, filed on Feb. 4, 2003, now abandoned.

(51) Int. Cl.[7] ............................. F02B 53/00; F01C 1/00; F01C 1/073
(52) U.S. Cl. ......................... 123/245; 418/35; 418/36; 418/38
(58) Field of Search .................. 123/245; 418/34–38; F01C 1/073

(56) References Cited

U.S. PATENT DOCUMENTS

| | | | | |
|---|---|---|---|---|
| 41,327 A | * | 1/1864 | Shedd et al. | 418/38 |
| 191,250 A | * | 5/1877 | Nordmann, Jr. | 418/35 |
| 895,043 A | * | 8/1908 | Rossbach-Rousset | 418/35 |
| 1,367,591 A | * | 2/1921 | Duncombe | 123/245 |
| 1,991,308 A | * | 2/1935 | Zens | 418/35 |
| 3,136,303 A | * | 6/1964 | Ievins | 123/245 |
| 3,203,405 A | * | 8/1965 | Sabet | 418/36 |
| 3,645,239 A | | 2/1972 | Cena | |
| 3,858,560 A | * | 1/1975 | Harrington | 418/36 |
| 4,153,396 A | * | 5/1979 | Landry | 418/38 |
| 4,319,551 A | * | 3/1982 | Rubinshtein | 123/245 |
| 4,373,879 A | * | 2/1983 | Picavet | 418/35 |
| 4,553,503 A | | 11/1985 | Cena | |
| 4,605,361 A | * | 8/1986 | Cordray | 418/38 |
| 6,158,987 A | * | 12/2000 | Raikamo | 418/36 |
| 6,202,600 B1 | * | 3/2001 | Miceli | 123/18 R |
| 6,270,322 B1 | | 8/2001 | Hoyt | |
| 6,341,590 B1 | | 1/2002 | Barrera et al. | |
| 6,446,595 B1 | | 9/2002 | Sakita | |
| 6,626,643 B2 | * | 9/2003 | Staudenrausch | 418/35 |

FOREIGN PATENT DOCUMENTS

| | | | | |
|---|---|---|---|---|
| FR | 1 276 352 | * | 11/1961 | F01C/1/073 |
| JP | 52048710 A | * | 4/1977 | 418/37 |
| JP | 62150002 A | * | 7/1987 | 418/35 |
| WO | WO 2004067915 A1 | * | 8/2004 | F01C/1/073 |

OTHER PUBLICATIONS

Graham P. Collins, "Magnetic Soot", Scientific American, Jul. 2004, p. 26 & 29 Scientific American Inc, New York, NY, USA.

* cited by examiner

Primary Examiner—Thai-Ba Trieu

(57) ABSTRACT

Two-cycle, single vane impeller, hinged hub rotary engines are simple embodiments of a new class of engines. The 2-cycle, hinged hub rotary engines have dependently rotating impellers with, interdigitated, alternating hub sections, a hinge like rotation joint. These 2-cycle engines have expansion and exhaust cycles. The intake and compression cycles are performed by a synergistic air compressor (fan or piston type). Fuel and oxidizer (e.g. compressed air, from a synergistic air compressor,) are injected, to create combustion mixtures, and spontaneously ignited to start the expansion cycle in the minimized expansion sector(s).

8 Claims, 15 Drawing Sheets

Y-AXIS $+$ X-AXIS

COMBUSTION/EXPANSION/POWER

EXHAUST

TIME →

Y-AXIS
+ X-AXIS

Injection Fuel only — Exhaust

Injection Compressed Air Only — Exhaust

Injection Fuel + Compressed Air — Exhaust

TWO-CYCLE ROTARY ENGINES

This patent application is a Continuation-in-Part, of U.S. patent application Ser. No. 10/357,547, filed Feb. 4, 2003 now abandoned.

BACKGROUND

1. Field of Invention

This invention relates to rotary internal combustion engines, and to, 2-cycle, alternating hub section, hinged hub impeller, rotary engines.

2. Prior Art

Sakita, U.S. Pat. No. 6,446,595 B1, Sep. 10, 2002, "Rotary Piston Engine", discloses: 2 rotating disks, (FIG. 1, parts 30 & 32 and/or FIG. 22, parts 230 & 232), inner and outer shafts (38, 36), with piston assemblies (30,32), (disks), rigidly attached, (FIG. 1, Col. 4, lines 60–67+). A type of exhaust products purge system, (Col. 6, lines 16–19), " . . . The exhaust port is provided with an air nozzle 79 at its mouth to spray fresh air into the exhaust subchamber for scavenging the remaining exhaust air inside the subchamber. . . . " Comment: in general, complete control of engine rotation using gears; no need for clutches or electromagnetic devices or microprocessor-sensor based control box(es) for rotary engines, even if these were added they could not overpower the gear system engagement control without breaking it. Also, there appears to be no flexibility for compression ratio variation or control in real time.

Barrera et al., U.S. Pat. No. 6,341,590 B1, Jan. 29, 2002, "Rotary Engine", discloses: a rotary disk machine, with upper and lower center rotating members, 36 & 38, (Col. 8, lines 8–9, FIG. 4, and FIG. 6), and two concentric power shafts, 24 & 26, (Col. 8, lines 4–6, FIG. 1). A type of two-stroke-cycle is disclosed in Col. 5, lines 10–24, " . . . number of toroidal pistons to be used is for two-stroke-cycle: P=2*n,* where n=1,2,3,4 . . . where P is the even number of toroidal pistons (equal to the number of chambers) . . . the even number of cavities to be used must be multiple of 2 (compression and power strokes) . . . ". Note: These two patents, Sakita and Barrera, have the side by side rotation hubs and concentric output shafts characteristic of rotary disk machines.

Hoyt, U.S. Pat. No. 6,270,322 B1, Aug. 7, 2001, "Internal Combustion Engine Driven Hydraulic Pump", discloses: in the Abstract, reciprocating rotary engine, and in Col. 1, lines 13–15, " . . . two-stroke, rotating/reciprocating, internal combustion engines that convert combustion energy into direct hydraulic work . . . " and " . . . trunnion bearing mount 80 providing a hinge motion . . . ", and in Col. 19 lines 47–48, FIG. 23; " . . . a first reciprocating rotor 10 ("reciprotor") and a second rotor or reciprotor 11." Col. 6, lines 50–51, FIGS. 2 & 3. Note Col. 8, lines 64–65, " . . . the reciprocating rotating combustion engine 1 of the present invention preferably performs no net shaft work . . . ". Comment: This is basically a reciprocating rotary disk machine; a rather complex and convoluted, reciprocating rotary disk machine.

Cena, U.S. Pat. No. 3,645,239, Feb. 29, 1972, "Rotary Piston Machine", discloses: a rotating annular cylinder block 2, Abstract, Col. 2, line 59+, and FIG. 3. Note: Col. 3, lines 52–75, " . . . operation of the two-cycle engine . . . Pumping chambers . . . just finished the intake cycle and starting to compress the Fuel and air mixture. While . . . combustion chambers . . . finished the compression Stroke . . . to ignite the fuel and air mixture . . . in combustion chambers . . . have finished the expansion and at the same time are charged and with fuel and air . . . driving away the burnt gases through the exhaust ports . . . ".

Cena, U.S. Pat. No. 4,553,503, Nov. 19, 1985, "Rotary Piston Machine", discloses: " . . . arcuate pistons inside a rotating annular cylinder block . . . " and " . . . scissor-action-type eccentric cranks . . . ", Abstract, and Col. 3, lines 42–57, " . . . operation of the two-cycle engine . . . combustion chambers . . . finished the compression stroke . . . to ignite the fuel and air mixture . . . burned gases are thus expanded . . . simultaneously exhausting the burned gasses, and then compressing the new gas and air mixture . . . ".

The above, (et al. see prior application Ser. No. 10/357, 547), establish generic means for the common rotary engine structures/functions including: engine volume/space enclosure means, rotation transfer means, fuel injection means, combustion mixture creation and ignition means, rotary engine control means, timing means, exhaust means, et al. The specific structure design to provide a specific function is application related and could be considered a design choice.

SUMMARY

Two-cycle, single vane, hinged hub rotary engines are simple embodiments of a new class of engines. The hinged hub rotary engines have two dependently rotating impellers with interdigitated, alternating hub sections, forming a hinge like rotation joint. These 2-cycle engines have expansion and exhaust cycles. The intake and compression cycles are performed by a synergistic air compressor (fan or piston type). Fuel and oxidizer (e.g. compressed air, from a synergistic air compressor,) are injected, to create combustion mixtures, and spontaneously ignited to start the expansion cycle in the minimized expansion sector(s).

These 2-cycle, alternating hub section, hinged hub rotary engines have many embodiments, variations, and applications and may have air, marine, land, and space, operating environments, and configurations.

DRAWINGS NUMBERS KEY

Figure 1:
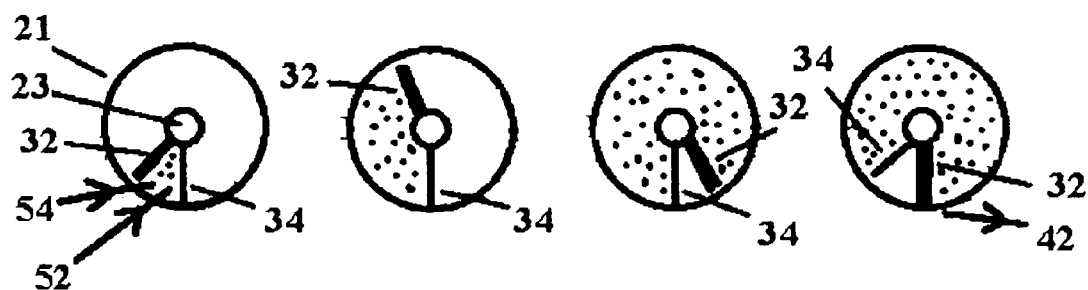
FIG. 1 Engine cycles (combustion/expansion/power and exhaust) of 2-cycle, single vane, hinged hub, rotary engines. Note: The locked position is at 6 o'clock.
Figure 1:
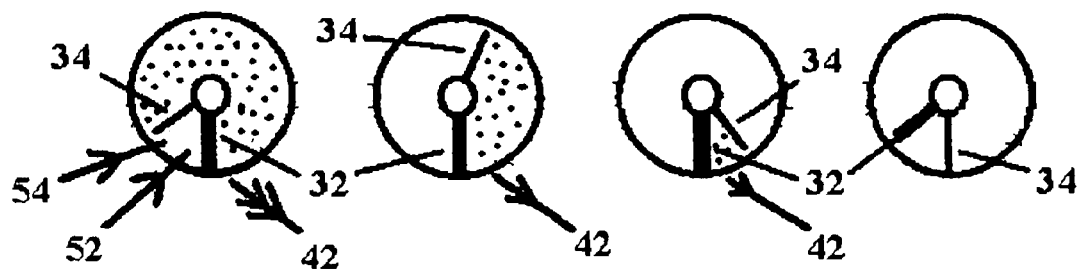

Note: in the drawings. "M" denotes=mirror image/object.
21. Interior Engine Wall
23. Power Shaft
25. Engine Interior Wall lining, expandable
27. Detail area of FIG. 5, expandable, overlap joint of lining, 25
32. Impeller A, single vane, alternating hub section, hinged hub
33. Collar of Impeller A
34. Impeller B, single vane, alternating hub section, hinged hub
35. Collar of Impeller B
42. Exhaust gas slot
44. Exhaust gas chute
45. Air compressor, integrated, synergistic, of piston or fan type
46. Compressed air/oxidizer, storage tank
48. Control unit, 2-cycle rotary engine or rotary engine control means
50. Electric generator, integrated, synergistic
52. Fuel injector, fuel injection means
54. Air injector, compressed air, and generically, oxidizer and the air injector, generically, an oxidizer injection means
62. End Cap
67. Electric clutch
68. Electric clutch
71. Strike arm
72. Trip clutch
73. Trip clutch pivot pin
74. Return spring
75. Stop block
76. Solenoid
77. Collar engagement bar
79. Lifter block with ramp face

DESCRIPTION

Two-cycle, single vane, hinged hub impeller, rotary engines have a general embodiment of: 2-cycle, hinged hub devices/impellers, that rotate a with means to rotate a) power output device/shaft. The two cycles are: expansion and exhaust. Hinged hub devices/impellers have joined, meshed, interdigitated, alternating hub sections and dependently rotate at a hinge like rotation joint.

FIG. 1 represents the two engine functions/cycles of 2-cycle, single vane, hinged hub impeller, rotary engines. The captured position is at 6 o'clock. The impellers, alternately, rotate, clockwise, 360 degrees. Illustrated and described separately, these cycles occur simultaneously.

Expansion, starting at far left, impeller 32 has been released, and impeller 34 has just been locked into position (captured) at 6 o'clock. Fuel is injected, 52, into the hot minimized sector. Then compressed air, 54, is injected into the fuel vapor. spontaneous combustion occurs and the combustion products force impeller 32 to rotate. As impeller 32 rotates passed the exhaust port, 42, impeller 34 is released, and impeller 32 is captured at 6 o'clock position.

Exhaust cycle, starting at far left, fuel, 52, and compressed air, 54, are injected into the hot, minimized sector, "behind" impeller 34, as the sector expands, prior event combustion products, "ahead" of impeller 34 are impelled out of the exhaust slot/port, 42.

There exist many present and possible future means to: engage and disengage the "dynamic" impeller(s) with the power shaft, capture and release the "static" impeller(s), create and ignite combustion mixtures in the minimized sector(s), and impel combustion exhaust gases etc. out of the engine. Single vane impellers are illustrated, FIGS. 2, 3, & 4. Hinged hub impellers with any number of vanes could be used in 2-cycle, hinged hub impeller, rotary engines (add appropriate injectors, and exhausts, and control). Multiple vane alternating hub section impellers have been described and may have unique applications, shapes and construction protocols. See patent application Ser. No. 10/916,711.

Note: Working from 14 psi pressure at sea level, then a 10 to 1 compression would be 140 psi, easily within normal air compressor technology. A 20 to 1 compression ratio would be 280 psi, at the high end of normal air compressor technology. The Applicant's understanding is that gasoline reciprocating piston engines operate with compression ratios around 10 to 12 and that diesel reciprocating piston engines operate with compression ratios around 18 to 20. The peak combustion pressure within reciprocating piston cylinders is around 2300 psi.

Separation of the compression function(s) devices and the combustion function(s) devices, implies the compression device may be substantially lighter than the combustion device. Also the hinged hub impeller rotary engines may operate at lower peak combustion pressures within the sectors allowing lighter construction. Hinged hub impeller rotary engines may have combustion pressure curves that are plateau like and peak pressures dependent on the load(s) on the power shaft. See FIG. 14. In the present invention, the combustion mixture pressure is controlled by compressed air injection, and by timing the release and capture of the respective impeller blades, and is included among the functions of the rotary engine controller.

Figure 2:
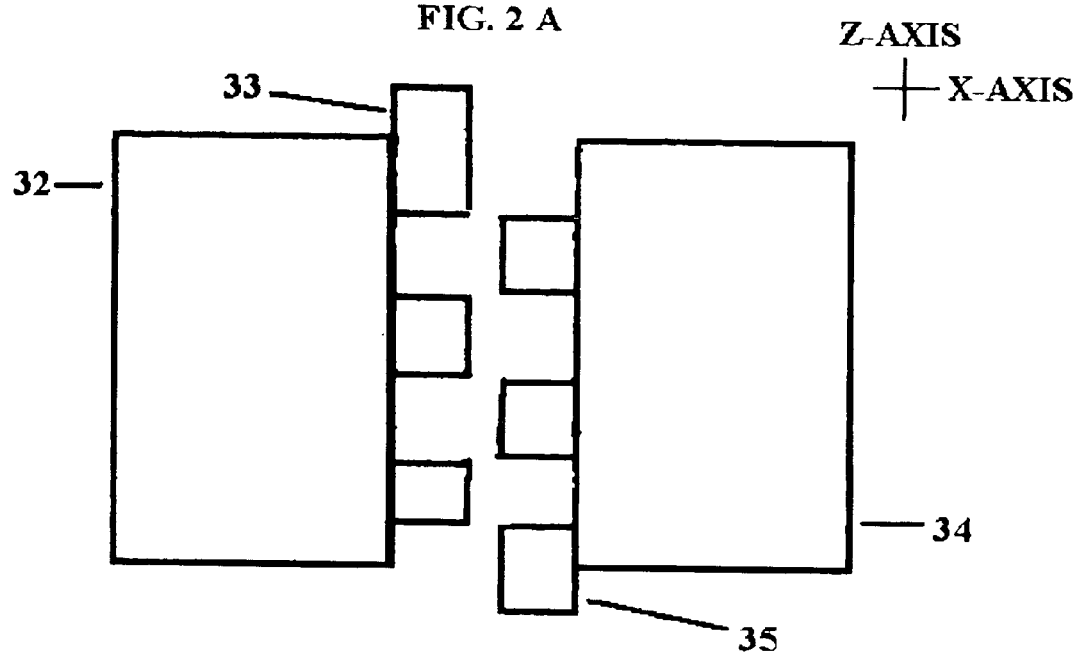
FIGS. 2A–2B A pair of single vane/blade, hinged hub impellers, separated.
Figure 2:
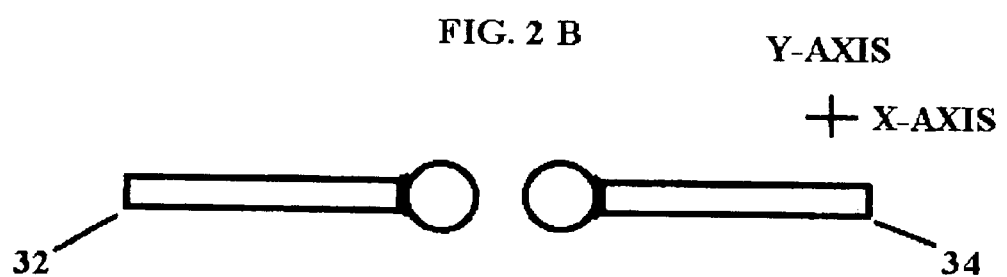
Figure 3:
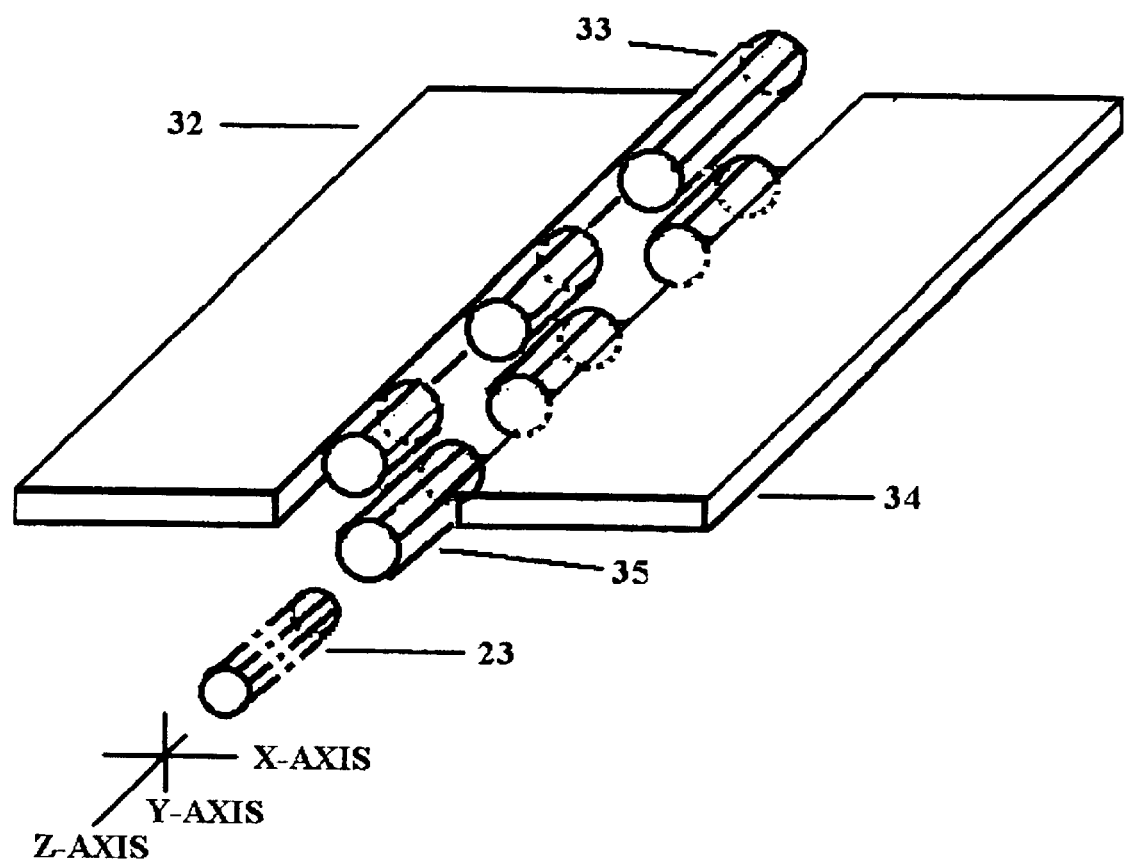
FIG. 3 A pair of single vane, alternating hub section, hinged hub impellers, and the power output shaft.

FIGS. 2, A, B, & 3, illustrate single vane hinged hub impellers, 32 and 34, separated from each other and from the power shaft, 23. The alternating hub section, hinge nature, of the hub joint and the collars, 33 and 35, respectively are illustrated. The number of hub sections and power shaft-hub-impeller-engine wall configuration(s) could be application specific. For example: a light weight, hollow, power shaft may function in aircraft engines and hinged hub impeller vanes, with concavo-convex and/or helical forms, may be able to rotate at relatively high rotation rates without a specific captured or locked position.

The respective impeller and collar are one piece construction and co-rotate, the collars extend through the respective end wall of the engine wall, and means to engage and disengage the power shaft, and release and capture (lock into position) the respective impellers, can act on/through the respective collars. Likely determined by applications, and materials, and design choices, and constructions, many possible means of impeller control exist. Impeller momentum, controlled by a timing means, for respective impeller release and capture. The balance of combustion mixture pressure and momentum transfer and power shaft output, may be included as provided by the rotary engine controller.

Figure 4:
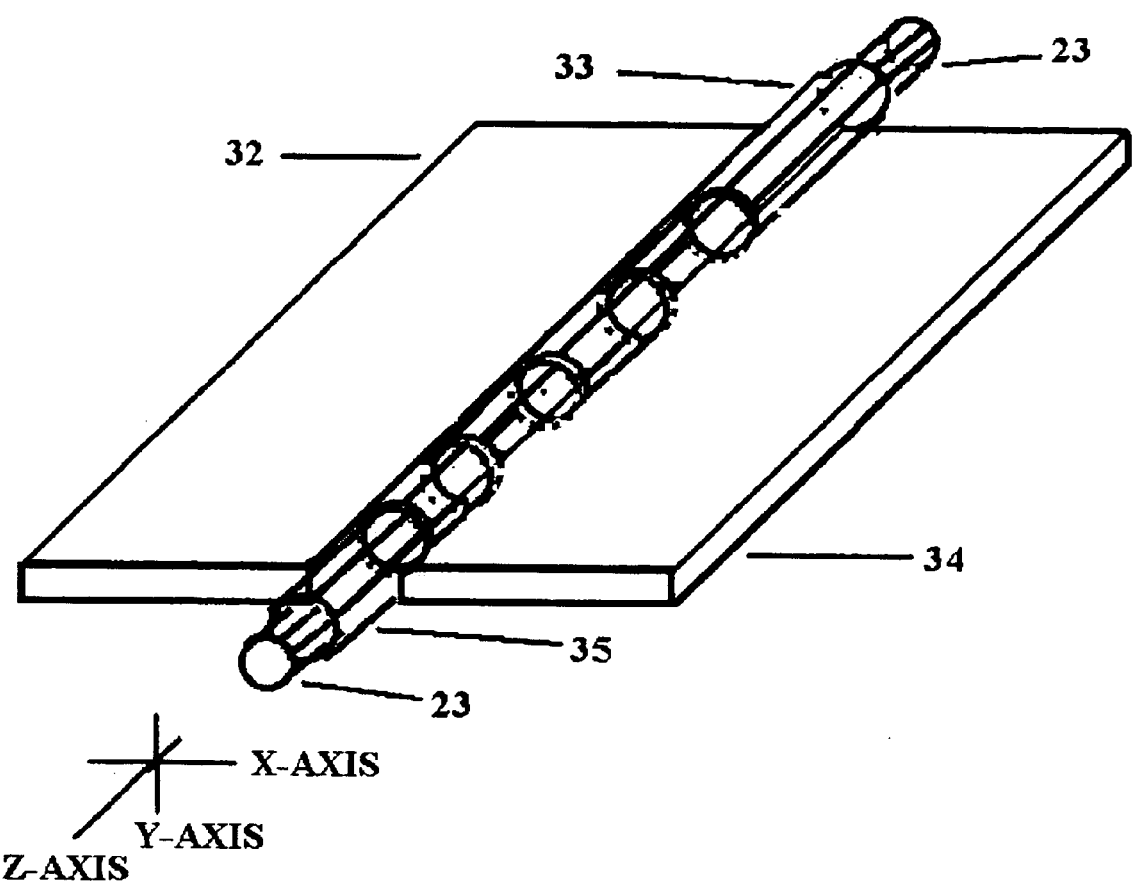
FIG. 4 A pair of single vane, joined, meshed, interdigitated, alternating hub section, hinged hub impellers, assembled onto the power output shaft. These (and the power output shaft) are the only moving parts of the engine's interior (work volume) and dependently rotate at a hinge like rotation joint.

FIG. 4: Assembled onto the power shaft, 23, the single vane, hinged hub impellers, 32 and 34, illustrate the three moving interior parts of the 2-cycle, single vane, hinged hub impeller rotary engine. Note: The term "dependent rotation" has been used to describe the rotation characteristics of the hinged hub impellers.

Figure 5:
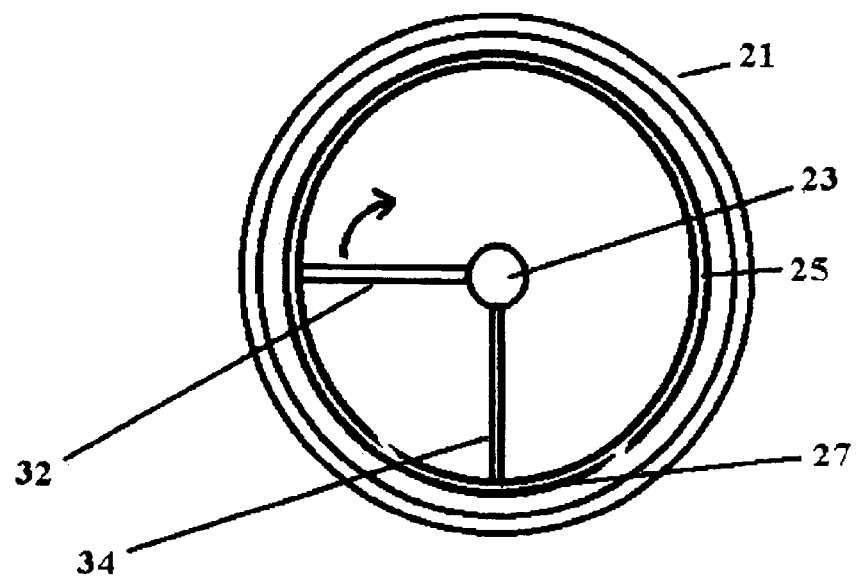
FIG. 5 The engine wall bushing/lining (expandable), 25, is in place. The engine wall, 21, encloses a space with rotating, hinged hub impellers, 32 & 34, and power shaft, 23. Impeller 34, is locked into position, captured, at the 6 o'clock position FIGS. 6A–6E Detail, 27, of the expandable joint in lining seal, 25, and other possible seal designs.

FIG. 5 illustrates one possible seal, an expandable liner, 25, that covers the entire cylindrical interior engine wall, with cut outs and lips, for exhaust slots, fuel, and air injectors. The lips prohibit the expandable liner from rotating with the impellers. The expandable, spring tension, liner has a manufactured interior diameter slightly less than the maximum outside diameter of the impellers, 32 & 34. The expandable liner, in place around the impellers, has a manufactured outside diameter slightly less than the inside diameter of the interior engine wall, 21.

The combustion overpressure expands part of the liner to contact the engine wall while spring tension retains liner contact with the impeller vane edges. This type of seal may have one or more active layers.

Figure 6:
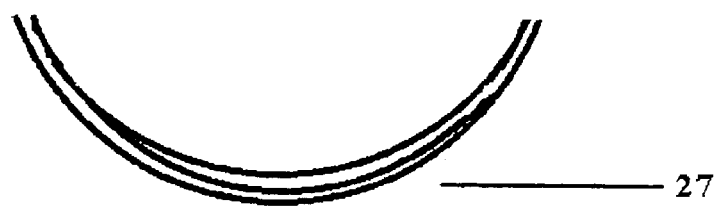
Figure 6:
Figure 6:
Figure 6:
Figure 6:

FIG. 6A, illustrates one possible, expandable, overlap joint, 27. FIGS. 6 B–E illustrate other types of possible seal designs: FIG. 6B, cross-section of potential seal for, impeller edge to interior engine wall; FIG. 6C, potential seal for, impeller edge to end wall plate; FIG. 6D, potential seal for hub section joints, z-y plane; FIG. 6E, potential seal for hub section joints, x-y plane. These seals could be machined or molded from high temperature bushing materials and have corner overlap sections. Alternatively, the seals could be made/cut from metal matrix, mesh, brush, foam, or one side of metal Velcro material and the carbon buildup (during operation) on/in the metal brush or matrix (when in place) would form the seal. These seals would be stable at high temperatures, and relatively pliable and may even be "self-repairing".

Figure 7:
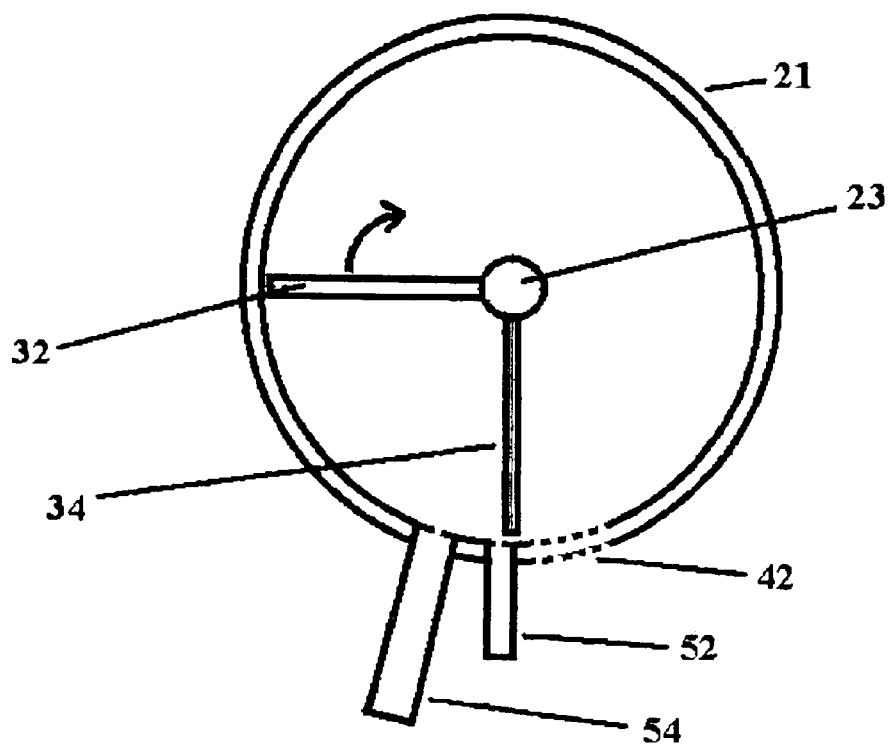
FIG. 7 Fuel injector, 52, and Air injector, 54 (could be combined into single unit, operate separately or simultaneously) and exhaust slot/port/valve, 42.

FIG. 7 illustrates; fuel injectors, 52, and compressed air injectors, 54. The exhaust slots(s), 42, may have angled ribs (not shown) to support and clean the impeller seals. These injectors and exhausts may have configurations that allow the hinged hub impellers to rotate at relatively high rates. There may be multiple injections per cycle.

Figure 8:
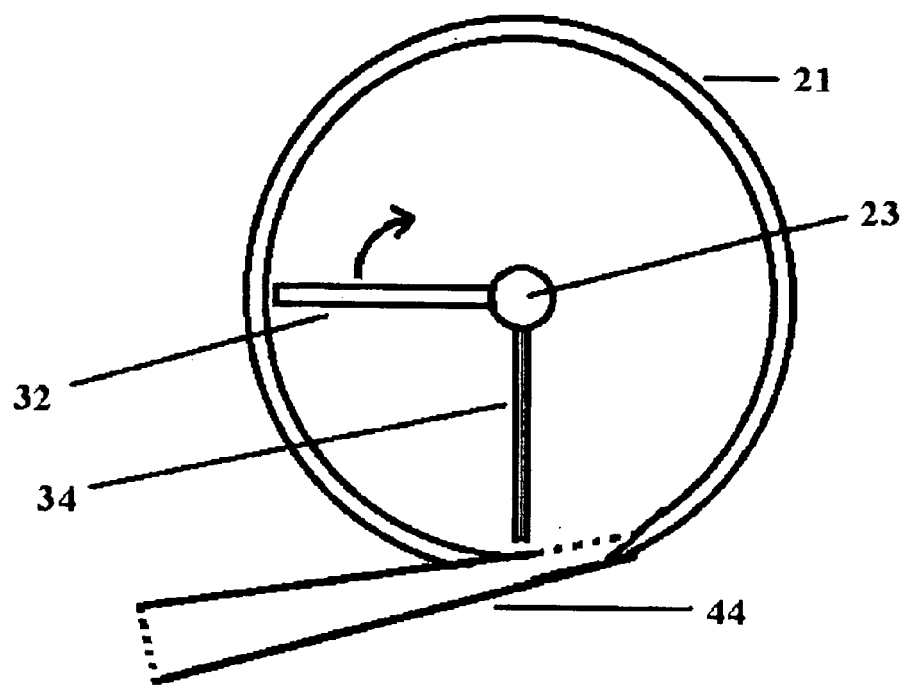
FIG. 8 Exhaust gas chute, 44.

FIG. 8 illustrates, a possible exhaust gas chute, 44, configuration. Note: This configuration/embodiment requires cutouts or passages for the fuel and air injectors. The heat of the exhaust may be used to heat the injected fuel and air, to facilitate operations in cold environments.

Figure 9:
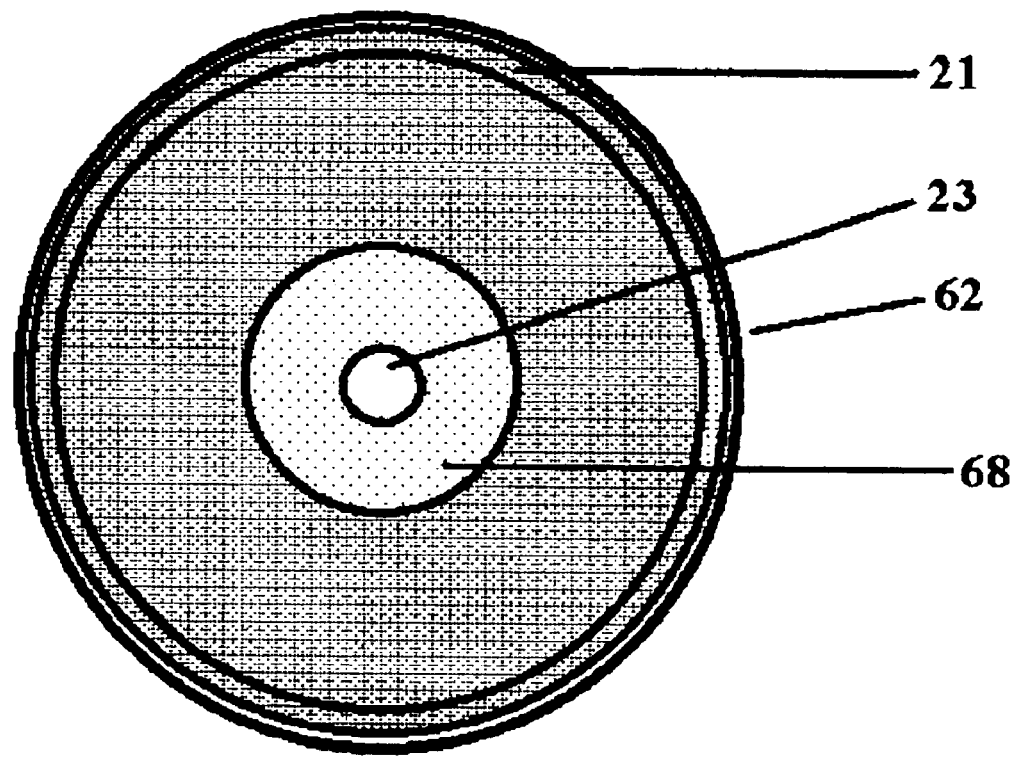
FIG. 9 End cap, 62.

FIG. 9 illustrates a possible embodiment of end cap, 62, this configuration has a threaded, screw-on end cap. The end cap has a high temperature stable bushing and seal for the impeller collar-power shaft, 23, passage. The threaded nature of the end cap allows the pressure/seal between the impeller facing edge and the end wall seal plate (not shown) to be adjusted. This embodiment also illustrates the placement of electric clutches, 68, controlled by/with a rotary engine control box (not shown). Electric one-way clutches may allow the hinged hub impellers to rotate at relatively high rotation rates without a specific captured or locked position. These electric clutches may be quite large, and capable of transferring large power loads. Multiple pressure plate designs are a possible approach.

Figure 10:
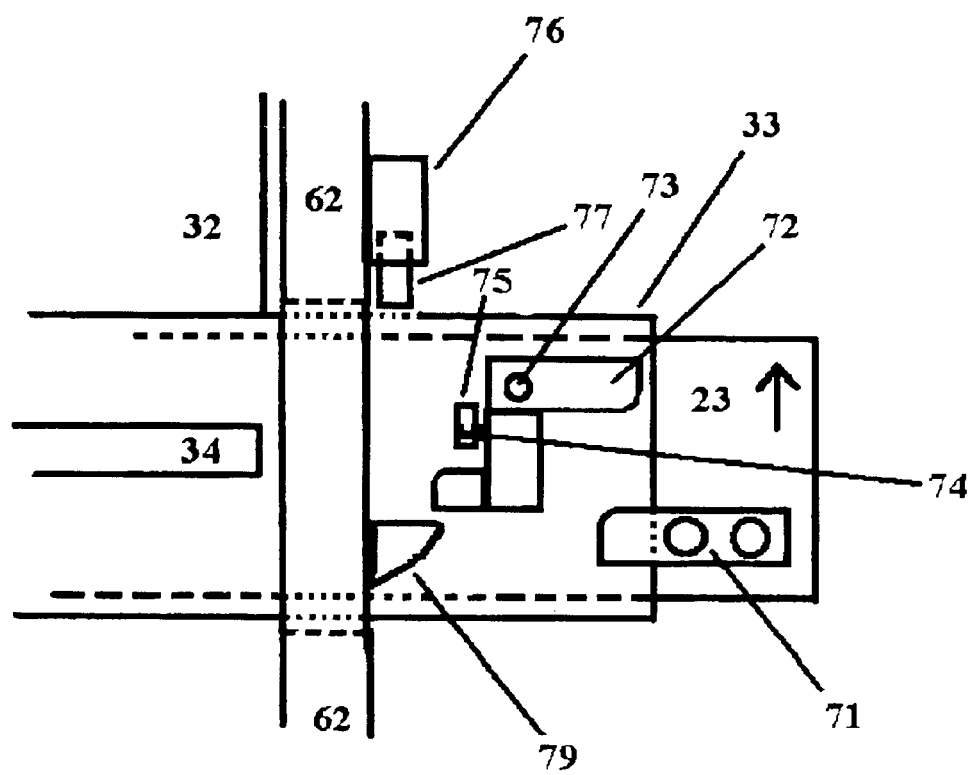
FIGS. 10 & 11 Detail of mechanical trip clutch, 71–79, and impeller 32, release, and, impeller 34, capture.

FIG. 10 illustrates a possible type of trip clutch. The impeller-collar, 32–33, extends through the end cap, 62, and has just been released by the solenoid, 76, withdrawing the collar engagement bar, 77. At the other end of the engine, a mirror image collar engagement bar, 77M, will capture (lock into position) the impeller-collar, 34–35, as it rotates into position. The strike arm, 71, mounted on the rotating (clockwise, direction of arrow) power shaft, 23, will strike and pivot the trip clutch, 72, around the trip clutch pivot pin, 73. The trip clutch, 72, will return by spring, 74, to contact with the stop block, 75. While powered, the backsides of the trip clutch, 72, and the strike arm, 71, are in contact, FIG. 11. As the impeller-collar-power shaft, 32-33-23, rotates around, the trip clutch, 72, is pivoted by the lifter block ramp face, 79, and delivers a momentum pulse to the power shaft, 23, FIG. 11. the collar engagement bar, 77, will capture impeller-collar, 32–33, as it rotates into position. Note: Making the strike arm, 71, and the trip clutch, 72, with super magnetic materials and orienting them to have opposing magnetic fields at closest approach may ease the function of both. May also have threaded, keyed, toothed or splined thickness spacer (not shown) for collar, (allow pivot pins more threads, contact area, depth, etc.).

Figure 11:
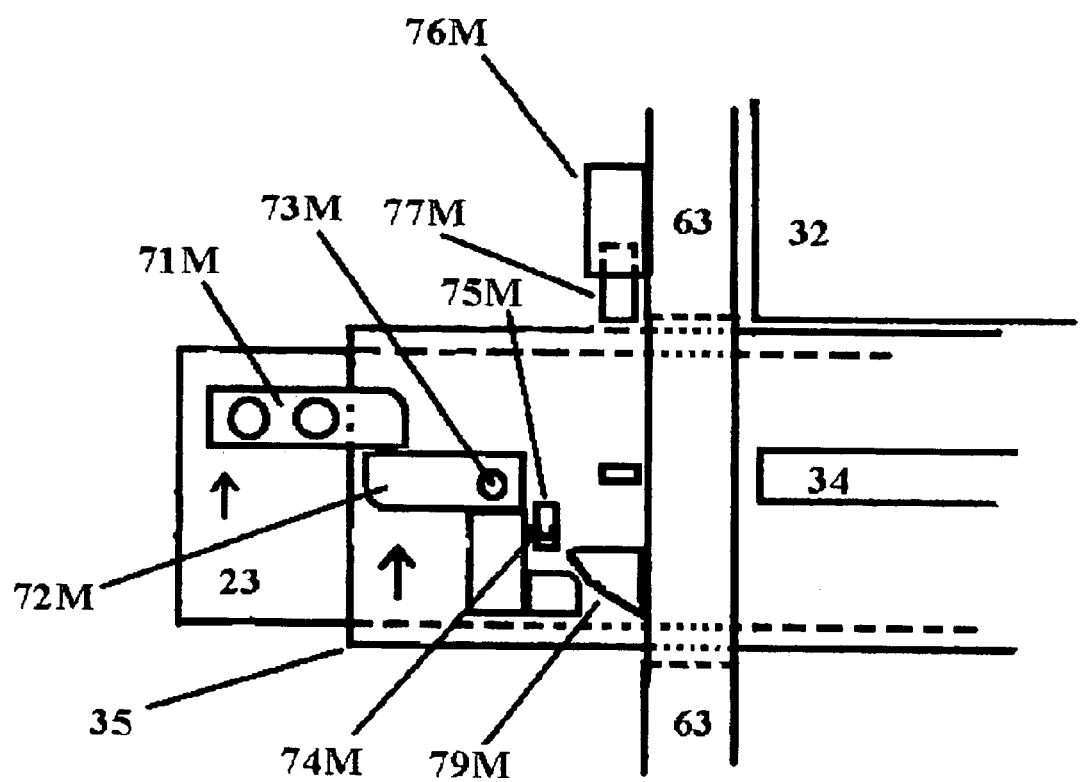

FIG. 11 illustrates a mirror image solenoid, 76M, and trip clutch, 72M, and etc. which operate on the collar, 35, of the other impeller, 34. Note: Other types of one-way clutches and means to transfer rotation to the power output shaft are known.

Figure 12:
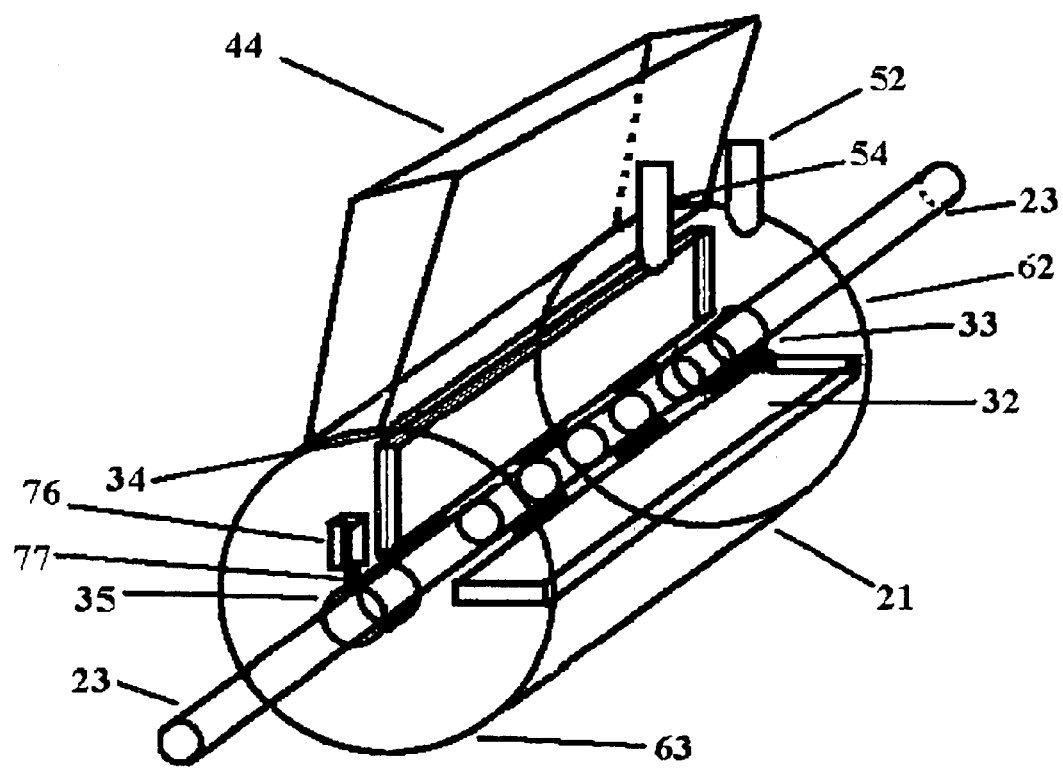
FIG. 12 Transparent view of a pair of single vane, hinged hub impellers in a 2-cycle rotary engine embodiment with a vertical exhaust chute, 44, and with the captured or locked position at 12 o'clock, impeller, 34.

FIG. 12 illustrates a "transparent" view of an engine embodiment with a vertical exhaust chute, 44. In this embodiment, the impeller capture or locked position is at 12 o'clock. This embodiment has a cylindrical engine wall, 21, cross section in the z-x plane (not shown), enclosing a volume of space, within which two, rectangular, hinged hub impellers, 32 & 34, rotate, alternately in 360-degree steps. Note: Other engine wall and impeller configurations are possible, For example: An oval engine wall cross section, z-x plane, with hemioval or hemicircle impellers (may be easier to seal). Engine embodiments with more than two-hinged hub, impellers may be feasible. Engine embodiments that have hinged hub impellers with more the one vane would likely be more powerful (able to burn more fuel simultaneously). FIG. 12 illustrates an engine embodiment with the "flow" of injected and exhausted material, as perpendicular (radial) to the power shaft. Engine embodiments with the "flow" of injected and exhausted materials, as parallel to the power shaft are interesting. Such engines may have curved, helical, or complex forms of hinged hub impellers. High-temperature stable materials and self-lubricating bushings/bearings will likely result in unique (interesting) engines. Cooling could be no fuel injected, just cycle air. The vertical exhaust chute, 44, will aid in heat release, and with the exit opening, property oriented in the passing air stream, the Venturi effect may aid/facilitate engine breathing. Note: The angled ribs of the interior engine wall at the exhaust slot are not shown. These ribs are intended to support and clean the impeller seals as the impeller rotates past the exhaust slot.

Figure 13:
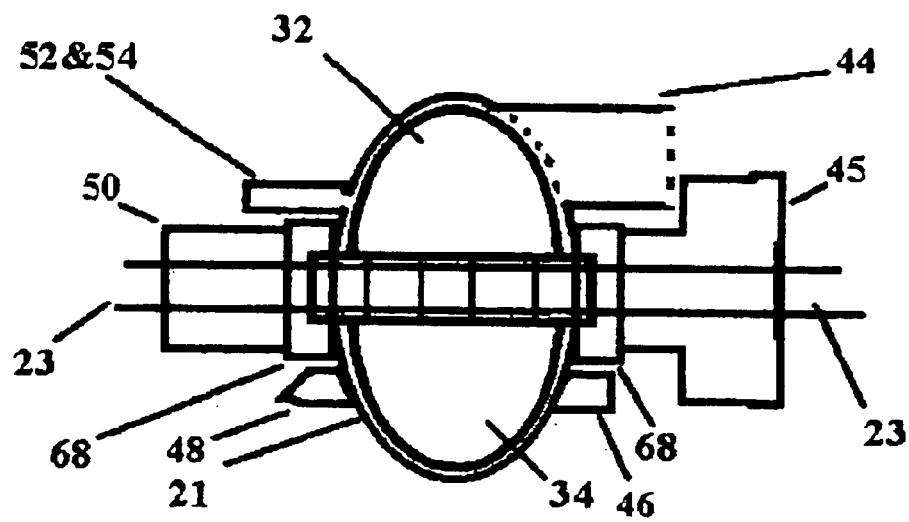
FIGS. 13A–13B Illustrates joined, hinged hub impellers, with a concavo-convex shape, rotating clockwise in an oval engine chamber, the fuel and compressed air are injected parallel to the power shaft and the exhaust exits parallel to the power shaft.
Figure 13:
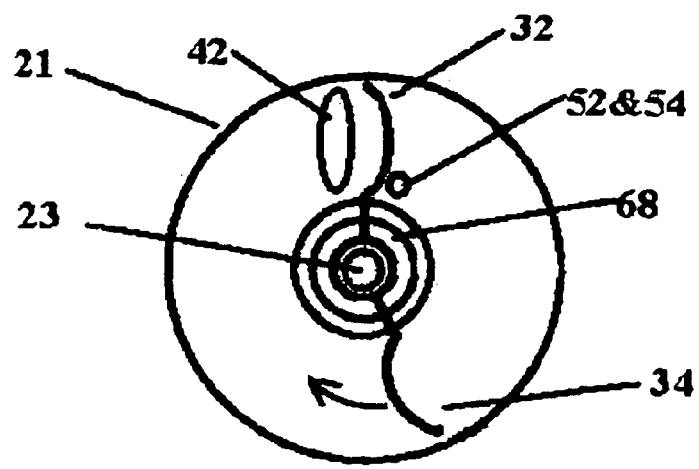

FIGS. 13A & B: Illustrates an embodiment with hemioval impellers (may be easier to seal) with a concavo-convex shape, rotating in an oval engine chamber (equatorial assembly joint), and with electric clutches transferring rotation. Combustion pressure on the concave face of the "leading" impeller pushes it to rotate clockwise, combustion pressure on the convex ace of the "trailing" impeller, will likely expand it, to non-rotating contact with the engine wall. The fuel and compressed air are injected parallel to the power shaft and the exhaust exits parallel to the power shaft. Other embodiments e.g., with helical vanes may have unique applications.

FIG. 13A, also illustrates the integrated: synergistic air compressor, 45, and the compressed air/oxidizer, storage tank, 46 and the 2-cycle rotary engine control unit, 48, and the synergistic, electric generator, 50.

Figure 14:
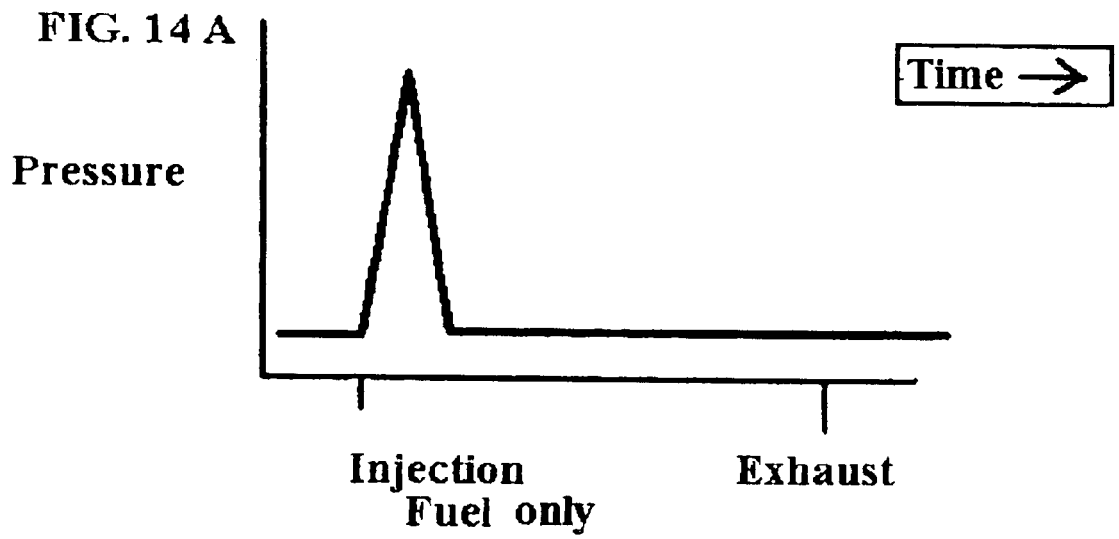
FIGS. 14A–14C Idealized pressure curves of combustion sector events; assumes non-perfect seals, and the dotted line represents maximum fuel combustion/injection.
Figure 14:
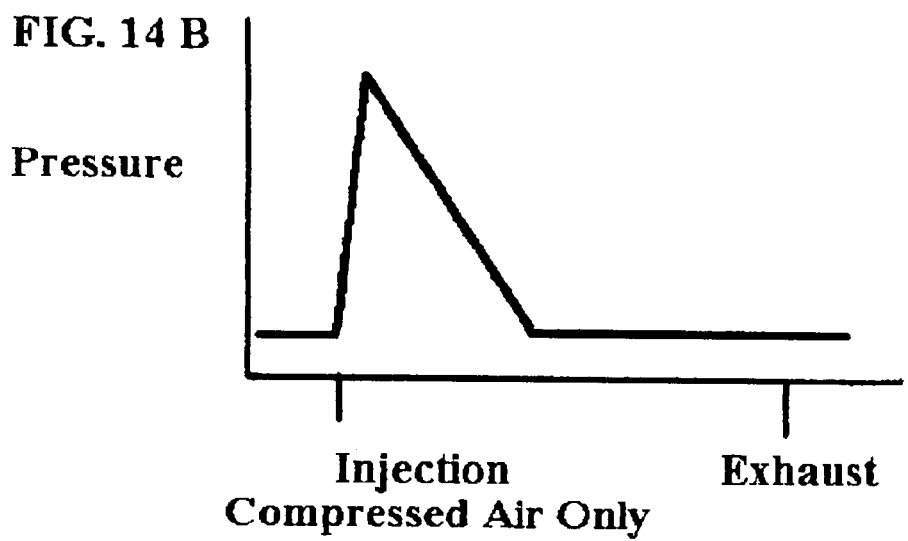
Figure 14:
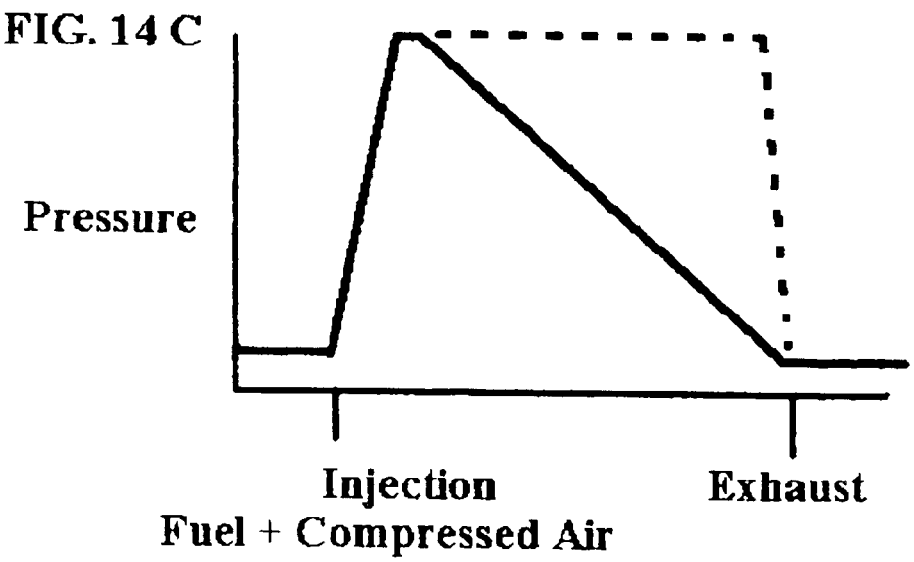

FIG. 14: Idealized pressure curves of combustion sector events; assumes non-perfect seals, and the dotted line represents maximum fuel combustion/injection. FIG. 14 A: Illustrates an idealized pressure curve of only fuel injected (or fuel only injection), unlikely to happen in real world operation, for illustration only. The pressure rises as the fuel is injected and vaporizes then the pressure falls rapidly as the impeller rotates. Assumes non-perfect seals with blow-by (leakage) which allows pressure to fall to exhaust ambient pressure. With perfect seals, the pressure curve would become negative as the impeller rotates and creates low (negative) pressure. FIG. 14B Illustrates the pressure curve of only compressed air injection, This may be a method of cooling the engine. The amount of compressed air injected may be varied to allow the pressure decline slope to end at exhaust. FIG. 14C Illustrates pressure curves of fuel and compressed air injection and combustion. The solid tine illustrates low power, high fuel efficiency, combustion pressure with near minimum fuel use (injection). The broken line illustrates high power, low fuel efficiency, combustion pressure with near maximum fuel use (injection). The compressed air injected may be varied to achieve complete combustion of whatever fuel is injected. The plateau-like maximum pressure represents the combustion pressure, within the sector, needed to rotate the impeller-power shaft with some degree of load on the power shaft.

Figure 15:
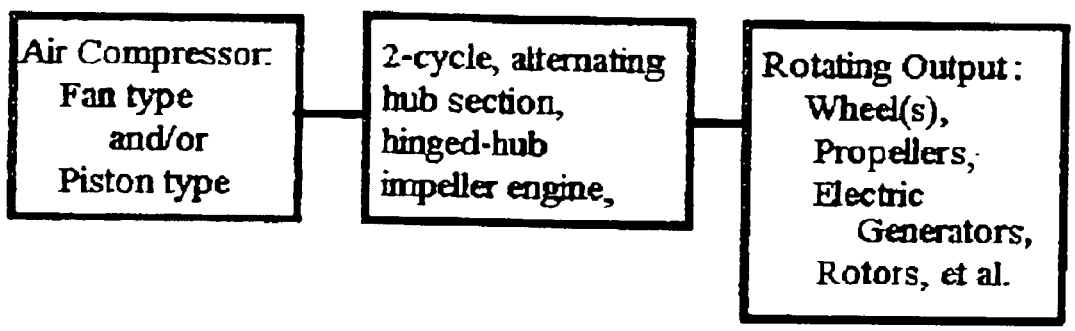
FIG. 15 Schematic of 2-cycle, hinged hub impeller rotary engines.

FIG. 15: Schematic of 2-cycle, hinged hub impeller rotary engines. The air compressor, performs the air intake and air compression functions, and may have a storage tank. The 2-cycle, alternating hub section, hinged hub impeller rotary engine performs the expansion and exhaust functions. The power produced, is directly related to the amounts of fuel and oxidizer (compressed air) injected into the minimized expansion chamber(s), and may rotate the group of devices including: wheels, propellers, electric generators, rotors, fans, et al.

These 2-cycle rotary engines inclusive of: an enclosure means providing for creating combustion/expansion chamber volumes and exhaust chamber/sector volumes, e.g. chambers formed/bounded by the engine case interior wall and hinged-hub impellers, in the embodiment described, there are two, single vane, impellers with, interdigitated, alternating hub sections, joined on the power output shaft. These impellers may have shapes and forms determined by application. Impellers with concavo-convex and or helical forms may have useful applications. The variable volume, expansion and exhaust, chambers are formed/animated as the power output shaft, and hinged -hub impeller(s) are rotated by the expanding volume within the expansion chamber. Note: The expansion chamber volumes and exhaust chamber/sector volumes are the same volumes and exist separately in time and function/result. The expansion chamber becomes the exhaust chamber when the dynamic impeller crosses the exhaust outlet/slot.

A wide range of rotation transfer means, for transferring the impeller(s) rotation to the power output shaft as the impellers rotate due to forces of expansion, is provided by the prior art in various fields, including roller-cam (one-way) clutches, pressure plate clutches, "non-backward mechanisms", electromagnetic devices, ratchets, hydraulic devices, electrical clutches, at el., and combinations.

Impeller connection to power shaft: There are likely several ways to transfer the impeller rotation to the power shaft, including: one-way clutch systems, ratchet systems, electric clutch systems and perhaps combustion pressure activated systems and/or electromagnetic systems. The system needs to smoothly match the power shaft rotation, deliver additional power and smoothly disengage from the power shaft and prohibit "reverse" rotation of the disengaged (static) impeller; roller-cam and or electric clutches may be the preferred method, until a real time, variable, solid gear system evolves. These engines will likely operate at some narrow optimum rpm range and adjusting the amount of fuel injected would vary the power output. These engines have been described as having capture/catch and release impeller systems, while possible, this simplicity is for illustration purposes. In the preferred embodiments, engines could likely operate with continuous impeller rotation, and the sector volumes determined by the relative rotation rates of the impellers and prohibiting, "reverse" rotation of the impellers.

Fuel injection means for injecting fuel, (into the minimized expansion chamber) are well known and provide choice of structures, configuration, and the like.

Oxidizer injection means, (common in some engineering fields), for injecting oxidizer into the expansion chamber are well known and provide choice of structures. The synergistic, air (oxidizer) compressor, could be the compressor fan type jet engines) and/or common, piston type air compressor.

Pressure for injectors (fuel and oxidizer), the pressure pump(s) for the injectors could be electric or belt driven from the power shaft. The synergistic, air compressor could also be direct or belt driven from the power shaft.

(A small high-pressure air tank may be needed for start up.) Note: Working from 14 psi pressure at sea level, then a 10 to 1 compression would be 140 psi, easily within normal air compressor technology. A 20 to 1 compression ratio would be 280 psi, at the high end of normal air compressor technology. The Applicant's understanding is that gasoline reciprocating piston engines operate with compression ratios around 10 to 12 and that diesel reciprocating piston engines operate with compression ratios around 18 to 20. The peak combustion pressure within reciprocating piston cylinders is around 2300 psi. By separating the compression function device and the combustion function device, the compression device may be substantially lighter construction (containing lower pressures) than the combustion device. Also the hinged hub impeller rotary engines, of the present invention, may operate at lower peak combustion pressures within the sectors allowing lighter construction. Hinged hub impeller rotary engines may have combustion pressure curves that are plateau like and dependent on the load on the power shaft. See FIG. 14.

If the machining tolerances (impeller edge to interior engine wall) are close enough, seals will not be needed. The seals are intended to maintain the working pressure in the expansion sector and to limit the blow-by from the high pressure side (expansion) to the low-pressure side (exhaust).

The expandable seat is an alternative approach to the blow-by problem. A sheet of bushing material is formed into a cylinder with both ends overlapping (and constant thickness in areas of overlap) and heat-treated to maintain the cylinder form with spring tension. The bushing material cylinder fits around the impeller-powershaft assembly and tension maintains a close fit of impeller edge to the bushing material. The bushing material cylinder, with the impeller-powershaft assembly inside, will just fit into the engine wall cylinder, as a lining. Combustion pressure will push the exposed section/sector of the bushing material against the engine wall while tension will keep the bushing material in contact with the rotating impeller edge. As the impeller-powershaft rotates around inside of the bushing cylinder, the overlap joint will expand. When the impeller rotates past the exhaust slot, the pressure is reduced and the overlap joint contracts to the diameter of the impellers. The cycle repeats at the next combustion event. The impeller(s)—interior wall seals may also be "grown", a metal and/or carbon matrix, foam, mesh, brushes et al., may be attached to impeller contact surface(s) and crush fitted to the engine interior wall-mating surface (at assembly), during operation, combustion products (carbon) may build up in the matrix material to form a high temperature seal. The use of a flexible, resilient, brush like material (Velcro) may create "active" seals, able to adapt to surface variations.

Ignition means for igniting fuel and oxidizer (combustion mixtures) in the minimized (or nearly so) combustion/expansion chamber are well known. The fuel and oxidizer may spontaneously combust and/or require an ignition source, scanning ultra-short pulse laser igniters are preferred to create a "many sources ignition event" in the expansion chamber. The fuel and oxidizer may be injected as needed to optimize the combustion event: e.g. start up may utilize fuel and oxidizer preheaters; injections into hot engine, expansion chambers may require timing and amount(s) variations and or multiple injections.

Control means, providing for controlling/sequencing engine/impeller(s) functions as needed along with all other engine functions, (for optimum desired operation) could be adapted from the large prior art group including; rotary engine computer control units/boxes, piston engine control devices, hybrid engine control sensors/computers, et at., and combinations.

Combustion mixture preignition pressure and combustion mixture pressure control means providing control of impeller release and capture timing, and injection timing, are included in the control means.

Exhaust means for directing and controlling, gaseous, ignition products from the exhaust sector, providing for optimum engine "breathing" and optimum engine operation are well known and likely a specific design choice depending on the intended engine application.

The 2-cycle rotary engine(s) described above, with expansion containment/confinement and exhaust cycles, utilize hinged-hub impellers with joined, meshed, interdigitated, alternating hub sections in a hinge-like rotation joint. Hinged-hub impellers with vanes of concavo-convex and/or helical forms/shapes may have useful applications. The expansion chambers may be formed/defined by the relative rotation rates of the impellers, the reverse rotation limiting/restricting/inhibiting forces only need to be slightly stronger than the positive rotation loads, and may be variable to reflect changing positive rotation loads.

Combustion mixture preignition pressure and combustion mixture pressure control means providing combustion mixture pressure controlled with impeller release and capture timing, and combustion mixture pressure controlled with relative rotation rates may be implemented with appropriate electric clutches, computer controlled by the rotary engine control box/unit. The use of the common term "compression ratio" is a misnomer, more precise would be "combustion mixture preignition pressure", and "combustion mixture ignition pressure", and combustion sector pressure, these terms have been included for clarity. "Combustion mixture pressure" is an effort at precision and clarification.

Embodiments: an air compressor fan assembly—2-cycle hinged hub impeller engine, (replacing the combustion section in "jet" engines,)—exhaust driven turbine—and a pusher propeller, and/or rotors, for use in aircraft et al. Another embodiment: an integrated air compressor fan assembly—hinged hub impeller engine—electric generator (compegen), for generating electrical power.

A descriptive naming protocol may be: engine cycles number (2 or 4), followed by capital R (hinged hub impeller rotary engines), followed by total number of impeller vanes/blades, followed by combustion/expansion chamber(s) total volume (in liters). The illustrated, 2-cycle, interdigitated, alternating hub section, hinged hub impeller rotary engine with two vanes/blades and with a 10 liter combustion/expansion chamber volume, would be a 2R2-10 engine.

This present invention may also be described as follows. A two-cycle, internal combustion, rotary engine comprising:
 a cylindrical engine wall and two end caps wherein an expansion chamber is enclosed;
 a power output shaft with two, single vane, alternating hub section impellers, rotatable within said expansion chamber whereby said expansion chamber is variably partitioned into an expansion sector and an exhaust sector;
 an expansion confinement cycle, and an exhaust cycle;
 joined, interdigitated, alternating hub section, single vane impellers whereby dependent rotation is achieved at a hinge like rotation joint, and;
 expandable seals, with spring tension, and fayed, between the impeller mating edge(s) and the interior engine wall whereby relatively gas tight seals are maintained between said impeller and said engine wall;
 a rotation transfer means whereby the impeller rotation, due to the expanding volume within said expansion sector, is transferred to the power output shaft;
 at least one fuel injection means whereby fuel is injected into the expansion sector;
 at least one oxidizer injection means whereby oxidizer is injected into the expansion sector;
 an ignition means, including spontaneous combustion, whereby fuel and oxidizer are ignited in the expansion chamber;
 a control means, a rotary engine computer control unit, whereby said engine functions, and said impeller functions, are controlled, and sequenced as needed and;
 an exhaust means, including an exhaust slot in said expansion chamber, whereby ignition, gaseous, products are controlled, and directed, from the exhaust sector.

The oxidizer injection means described above including a synergistic, air compressor, of piston or fan type, and at least one compressed air injector whereby compressed air, oxidizer, is injected into said expansion sector to form a combustion mixture with said fuel.

The 2-cycle rotary engine above further comprising:
 an oval engine chamber with an equatorial assembly joint;
 hemi-oval impeller vanes, with concavo-convex, spoon-like shapes, rotatable within said oval engine chamber, and crush fitted, matrix seals between the impeller edges and the interior engine wall.

The 2-cycle rotary engine above with-in a combined:

synergistic compressor—2-cycle rotary engine—synergistic electric generator whereby said, compressor, and engine, and generator, are integrated.

A method of producing a two-cycle, internal combustion, rotary engine comprising the steps of:

providing a cylindrical engine wall and end caps wherein an expansion chamber is enclosed;

providing a power output shaft with two, single vane, interdigitated, alternating hub section, impellers, rotatable within said expansion chamber whereby said expansion chamber is variably partitioned into an expansion sector and an exhaust sector;

providing an expansion confinement cycle, and an exhaust cycle;

providing, joined, interdigitated, alternating hub section, single vane impellers whereby dependent rotation is achieved at a hinge like rotation joint, and;

providing expandable seals, with spring tension, and fayed, between the impeller vane mating edges and the interior engine wall whereby relatively gas tight seals are maintained between said impeller and said engine wall;

providing a rotation transfer means whereby the impeller rotation, due to the expanding volume within said expansion sector, is transferred to the power output shaft;

providing at least one fuel injection means whereby fuel is injected into the expansion sector;

providing at least one oxidizer injection means whereby oxidizer is injected into the expansion sector;

providing an ignition means whereby fuel and oxidizer are ignited in the expansion chamber including a spontaneous combustion means;

providing a rotary engine, computer control unit as a control means whereby said engine functions, and said impeller functions, are controlled, and sequenced as needed and;

providing an exhaust means, including an exhaust slot, whereby ignition, gaseous, products are controlled, and directed, from the exhaust sector.

The method of producing the oxidizer injection means described above including the steps of:

providing a synergistic, air compressor, of piston or fan type;

providing, optional, at least one storage tank for the compressed air, and;

providing at least one compressed air injector whereby compressed air, oxidizer, is injected into said expansion sector to form the combustion mixture with said fuel.

The method of producing the 2-cycle rotary engine described above further including the steps of:

providing an oval engine chamber with an equatorial assembly joint;

providing, joined, interdigitated, alternating hub section impellers, with single vanes, of hemi-oval, concavo-convex, spoon-like shapes, rotatable within said oval engine chamber, and;

providing crush fitted matrix seals between the impeller vane edge and the interior engine wall.

The method of producing the 2-cycle rotary engine described above further comprising the steps of:

providing an oxidizer source, as a synergistic air compressor, and;

providing an integral, synergistic, electric generator whereby said 2-cycle rotary engine produces electric current.

A two-cycle, internal combustion, rotary engine comprising:

an engine wall wherein an expansion chamber is enclosed;

a power output shaft with two, single vane, alternating hub section impellers, rotatable within said expansion chamber whereby said expansion chamber is variably partitioned into an expansion sector and an exhaust sector;

an expansion confinement cycle, and an exhaust cycle;

joined, interdigitated, alternating hub section, single vane impellers whereby dependent rotation is achieved at a hinge like rotation joint;

rotation transfer means whereby the impeller rotation, due to the expanding volume within said expansion sector, is transferred to the power output shaft;

at least one fuel injection means whereby fuel is injected into the expansion sector;

at least one oxidizer injection means whereby oxidizer is injected into the expansion sector;

ignition means, including spontaneous combustion, whereby fuel and oxidizer are ignited in the expansion chamber;

control means, rotary engine computer control unit, whereby said engine functions, and said impeller functions, are controlled, and sequenced as needed and;

exhaust means, including an exhaust slot in said expansion chamber, whereby ignition, gaseous, products are controlled, and directed, from the exhaust sector.

A two-cycle rotary engine consisting of:

an engine working volume enclosure means;

a power shaft and, joined, alternating hub section, hinged impellers rotatable within said working volume, whereby variable volume, expansion and exhaust volumes are formed;

rotation transfer means, whereby the impeller rotation is transferred to the power shaft;

fuel and oxidizer injection means whereby fuel and oxidizer are injected into the expansion volume;

combustion mixture creation and ignition means whereby said fuel and said oxidizer create said combustion mixture and said ignition means, including spontaneous, initiates said combustion;

rotary engine control and timing means whereby the 2-cycle rotary engine functions and cycles are controlled, and timed, and;

an exhaust means whereby the exhaust is directed from said exhaust volume.

OPERATION

In general, the 2-cycle, single vane, hinged hub impeller, rotary engine functions are listed below, and illustrated in FIG. 1:

The static impeller is released (now dynamic) to rotate clockwise and the incoming (clockwise) impeller is captured (now static).

1. A combustion mixture is created and ignited in the minimized sector. In the present invention, fuel is injected "behind" the dynamic impeller, after the fuel vaporizes, compressed air is injected into the fuel vapor and spontaneous combustion occurs.

2. The dynamic impeller, under power from the spontaneous combustion products, rotates clockwise, and rotates the power shaft, and impels the prior combustion event products, out the exhaust slot.

3. As the power/exhaust cycle completes, the static impeller is released, the dynamic impeller is captured, and the cycle repeats, fuel is injected etc. . . .

Note: The two functions of this 2-cycle rotary engine are; temporary combustion containment/confinement and gaseous combustion products exhaust. The exhaust gases are impelled from the engine case by the rotation of one of the hinged hub impellers.

While, seal effectiveness and engine efficiency are directly related. The seal between the impeller contact edge and the engine case interior wall does not have to be perfectly machined. The engine can tolerate, in theory, some blow by. Gases escaping from the higher pressure combustion side, escape into the exhaust.

Embodiments of two-cycle, hinged hub impeller, rotary engines without a specific impeller capture or lock up, can have functions determined by the relative rates of rotation of the impellers. For example: fuel and compressed air injected at one end and exhaust impelled from the other end, (parallel to the power shaft) may allow the hinged hub impellers ( perhaps with helical forms) to rotate continuously, without a capture or lock up function.

The engine function can be adjusted, by balancing, among other things, temperatures, amounts, volumes, sizes and load(s) on the power shaft. For example: temperatures of injected fuel and compressed air, amounts of fuel injected, volumes of compressed air injected, size(s) of exhaust gas slot, exhaust gas composition(s). A rotary engine controller could coordinate these and other control functions as needed.

For example: the various engine events; including impeller rotations (release and capture,) and fuel and air injection, are sequenced (timed) by a rotary engine controller and associated control wire/paths, etc. (not shown).

In FIG. 7, the illustrated simple embodiment of the present invention the impellers rotate, alternately, clockwise in 360-degree steps. The impellers are alternately locked into position, captured, at the 6 o'clock position, impeller, 34, now static.

Fuel is injected, 52, "behind" the released impeller, 32, now dynamic, FIG. 7. After the fuel vaporizes in the hot, minimized sector, compressed air is injected, 54, into the fuel vapor, spontaneous combustion occurs and the combustion products force, impeller, 32, to rotate clockwise, engage and rotate the power shaft, 23, and impel the prior combustion event gases out the exhaust gas slot, 42. See FIG. 7. Note: Hydrogen fueled 2-cycle, single vane/blade, hinged hub impeller, rotary engines will likely have an exhaust "cleaner" than the intake air at some locations. Note: Various exhaust noise silencing techniques are known. These engines could be designed from the start to be "quiet", for example "anti-sound", sound wave cancellation devices and configurations.

Note; Any member of the group including, start up aids, for example: fuel and air preheaters (not shown), might be used at start up.

Referring to FIG. 10, as the power shaft, 23, rotates, (clockwise, direction of arrow), the solenoid, 76, withdraws, against spring resistance pressure, the collar engagement bar, 77, and the impeller-collar, 32–33, is released to rotate slightly as the strike arm, 71, hits the trip clutch, 72, which pivots around the trip clutch pivot pin, 73. On the other end of the engine a mirror image, spring loaded engagement bar, 77M engages the collar slot and locks impeller-collar, 34–35, into position. A mirror image solenoid, 76M, and mirror image trip clutch assemblies, 72M, are present. See FIG. 11. The trip clutch, 72, has returned by spring, 74, pressure to contact with the stop block, 75. As impeller, 34, is locked into position, a combustion mixture is created and ignited "behind" impeller, 32. Under power from combustion, the impeller-collar, 32–33, rotates until the backside of the trip clutch, 72, engages the backside of the strike arm, 71. The impeller-collar-power shaft, 32–33–23, rotates approximately 360 degrees under power. As the trip clutch, 72, is pivoted by the ramp face, 79, a momentum pulse is delivered to the power shaft. With proper spacing and timing, the impeller-collar, 32–33, can be captured (locked into position) by the engagement bar, 77. The cycle repeats with alternate impellers.

The preferred embodiment at this time is a pair of helical three-vane, hinged hub impellers, alternately rotating 120 degrees and electric clutches transferring power. Three sets of injectors and exhaust slots/chutes. Fuel is injected and ignited in one sector, low power range. Fuel is injected and ignited in two sectors, mid power range. Fuel is injected and ignited in three sectors, high power range. Potential applications:

Aircraft, light weight;

Ground, one engine at each drive wheel;

Marine, water-cooled;

Incorporated into a "jet" engine; fan compressor in front turned by exhaust turbine at back with a parallel flow, hinged hub impeller engine between, rotating/turning rotors, as a helicopter drive train;

Electric generator, combined, air compressor—2R engine—generator, ("compegen").

Note: These hinged hub impeller, rotary engines will likely rotate (operate) within an optimum rpm range, which may be configuration and application dependent. Note: The power output of these engines is directly related to the variable amounts of fuel and compressed air injected into the engine. Note: The use of high-temperature materials and self lubricating bushings and bearing may provide remarkable, 2-cycle, interdigitated, alternating hub section, hinged hub impeller rotary engines The background references of the prior art et al., (see prior application Ser. No. 10/357,547), establish generic means for the common rotary engine structures/functions including: engine volume/space enclosure means, rotation transfer means, fuel and oxidizer injection means, combustion mixture creation and ignition means, rotary engine control means, timing means, exhaust means, et al. The specific structure design to provide a specific function is application related and could be considered a design choice.

CONCLUSION, RAMIFICATIONS AND SCOPE

Two cycle, interdigitated, alternating hub section, hinged hub impeller, rotary, internal combustion, engines are a new, and unique, and useful, class of engines. Sophisticated embodiments of 2-cycle, alternating hub section, hinged hub rotary engines are likely to be developed as the engine concept evolves. High temperature materials and self-lubricating bearings may provide extraordinary rotary engines. Theory, materials, configurations, applications, size, (micro to huge), and operating environments, et al., are expandable fields. The concept, visualization/disclosure of these 2-cycle rotary engine inventions is the enabling paradigm for all present/future embodiments. These engines could be, (must be), designed, from the beginning, to be more efficient, cleaner, and quieter than contemporary internal combustion engines. Land, air, water, and space are conceivable operating environments for some embodiments of these 2-cycle, hinged hub impeller, rotary (2R) engines with joined, meshed, interdigitated, alternating hub section, single or multiple vane/blade, impellers.

What is claimed is:

1. A method of producing a two-cycle, internal combustion, rotary engine comprising the steps of:
   providing a cylindrical engine wall and end caps wherein an expansion chamber is enclosed;
   providing a power output shaft with two, single vane, interdigitated, alternating hub section, impellers, rotatable within said expansion chamber whereby said expansion chamber is variably partitioned into an expansion sector and an exhaust sector;
   providing an expansion confinement cycle, and an exhaust cycle;
   providing, joined, interdigitated, alternating hub section, single vane impellers whereby dependent rotation is achieved at a hinge like rotation joint;
   providing expandable seals, with spring tension, and fayed, between the impeller vane mating edges and the interior engine wall whereby relatively gas tight seals are maintained between said impeller and said engine wall;
   providing a rotation transfer means whereby the impeller rotation, due to the expanding volume within said expansion sector is transferred to the power output shaft;
   providing at least one fuel injection means whereby fuel is injected into the expansion sector;
   providing at least one oxidizer injection means whereby oxidizer is injected into the expansion sector;
   providing an ignition means whereby fuel and oxidizer are ignited in the expansion chamber including a spontaneous combustion means;
   providing a rotary engine, computer control unit as a control means whereby said engine functions, and said impeller functions, are controlled, and sequenced as needed and;
   providing an exhaust means, including an exhaust slot, whereby ignition, gaseous, products are controlled, and directed, from the exhaust sector.

2. The method of producing a 2-cycle rotary engine of claim 1, wherein the step of providing said at least one oxidizer injection means further includes:
   providing a synergistic, air compressor, of piston or fan type;
   providing, optional, at least one storage tank for the compressed air, and;
   providing at least one compressed air injector whereby compressed air, oxidizer, is injected into said expansion sector to form the combustion mixture with said fuel.

3. The method of producing the 2-cycle rotary engine of claim 1 further including the steps of:
   providing an oval engine chamber with an equatorial assembly joint;
   providing, joined, interdigitated, alternating hub section impellers, with single vanes, of hemi-oval, concavo-convex, spoon-like shapes, rotatable within said oval engine chamber, and;
   providing crush fitted matrix seals between the impeller vane edge and the interior engine wall.

4. The method of producing the 2-cycle rotary engine of claim 1 further comprising the steps of:
   providing an oxidizer source, as a synergistic air compressor, and;
   providing an integral, synergistic, electric generator whereby said 2-cycle rotary engine produces electric current.

5. A two-cycle, internal combustion, rotary engine comprising:
   a cylindrical engine wall and two end caps wherein an expansion chamber is enclosed;
   a power output shaft with two, single vane, alternating hub section impellers, rotatable within said expansion chamber whereby said expansion chamber is variably partitioned into an expansion sector and an exhaust sector;
   an expansion confinement cycle, and an exhaust cycle;
   joined, interdigitated, alternating hub section, single vane impellers whereby dependent rotation is achieved at a hinge like rotation joint;
   expandable seals, with spring tension, and fayed, between the impeller mating edge(s) and the interior engine wall whereby relatively gas tight seals are maintained between said impeller and said engine wall;
   rotation transfer means whereby the impeller rotation, due to the expanding volume within said expansion sector, is transferred to the power output shaft;
   at least one fuel injection means whereby fuel is injected into the expansion sector;
   at least one oxidizer injection means whereby oxidizer is injected into the expansion sector;
   ignition means, including spontaneous combustion, whereby fuel and oxidizer are ignited in the expansion chamber;
   control means, a rotary engine computer control unit, whereby said engine functions, and said impeller functions, are controlled, and sequenced as needed and;
   exhaust means, including an exhaust slot in said expansion chamber, whereby ignition, gaseous, products are controlled, and directed, from the exhaust sector.

6. The 2-cycle rotary engine of claim 5, wherein the oxidizer injection means includes:
   a synergistic, air compressor, of piston or fan type, and;
   at least one compressed air injector whereby compressed air, oxidizer, is injected into said expansion sector to form a combustion mixture with said fuel.

7. The 2-cycle rotary engine of claim 5 further comprising:
   an oval engine chamber with an equatorial assembly joint;
   hemi-oval impeller vanes, with concavo-convex, spoon-like shapes, rotatable within said oval engine chamber, and;
   crush fitted, matrix seals between the impeller edges and the interior engine wall.

8. The 2-cycle rotary engine of claim 5 with-in a combined:
   synergistic compressor—2-cycle rotary engine—synergistic electric generator whereby said, compressor, and engine, and generator, are integrated.

* * * * *

UNITED STATES PATENT AND TRADEMARK OFFICE
CERTIFICATE OF CORRECTION

PATENT NO. : 6,962,137 B2
DATED : November 8, 2005
INVENTOR(S) : Udy, Joseph D.

It is certified that error appears in the above-identified patent and that said Letters Patent is hereby corrected as shown below:

Column 3,
Line 59, should read -- devices/impellers, that rotate a (with means to rotate a) power --.

Signed and Sealed this

Seventeenth Day of January, 2006

JON W. DUDAS
*Director of the United States Patent and Trademark Office*